(12) United States Patent
Rohrs et al.

(10) Patent No.: US 8,676,797 B2
(45) Date of Patent: Mar. 18, 2014

(54) MANAGING AND ACCESSING DATA IN WEB NOTEBOOKS

(75) Inventors: Christopher Rohrs, Mountain View, CA (US); Michael Frumkin, Santa Cruz, CA (US); Avni Shah, Mountain View, CA (US); Benedict A. Gomes, Mountain View, CA (US); Bay-Wei Chang, Foster City, CA (US); P. Pandurang Nayak, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 384 days.

(21) Appl. No.: 11/746,912

(22) Filed: May 10, 2007

(65) Prior Publication Data

US 2007/0266011 A1 Nov. 15, 2007

Related U.S. Application Data

(60) Provisional application No. 60/799,476, filed on May 10, 2006.

(51) Int. Cl.
*G06F 17/00* (2006.01)

(52) U.S. Cl.
USPC .................................. 707/732; 707/E17.109

(58) Field of Classification Search
None
See application file for complete search history.

(56) References Cited

U.S. PATENT DOCUMENTS

| | | | |
|---|---|---|---|
| 5,515,496 A | 5/1996 | Kaehler et al. | |
| 5,760,773 A | 6/1998 | Berman et al. | |
| 6,119,135 A * | 9/2000 | Helfman | 715/206 |
| 6,310,630 B1 | 10/2001 | Kulkarni et al. | |
| 6,366,923 B1 * | 4/2002 | Lenk et al. | 707/706 |
| 6,522,342 B1 * | 2/2003 | Gagnon et al. | 715/716 |
| 6,631,496 B1 * | 10/2003 | Li et al. | 715/200 |
| 6,718,365 B1 | 4/2004 | Dutta | |
| 6,745,178 B1 | 6/2004 | Emens et al. | |
| 6,763,388 B1 | 7/2004 | Tsimelzon | |
| 6,763,399 B2 * | 7/2004 | Margalit et al. | 710/13 |
| 6,976,210 B1 * | 12/2005 | Silva et al. | 715/205 |
| 7,058,902 B2 | 6/2006 | Iwema et al. | |
| 7,206,839 B2 | 4/2007 | Ingram et al. | |
| 7,360,175 B2 | 4/2008 | Gardner et al. | |
| 7,478,336 B2 | 1/2009 | Chen et al. | |
| 7,503,012 B2 | 3/2009 | Chen et al. | |
| 7,702,811 B2 | 4/2010 | Gopalan et al. | |

(Continued)

FOREIGN PATENT DOCUMENTS

| | | |
|---|---|---|
| EP | 1 030 247 | 8/2000 |
| WO | WO 01/16807 | 3/2001 |

OTHER PUBLICATIONS

"Automating Web Browsing Task by Demonstration", Atsushi Sugiura et al., pp. 9-18, Japan.*

(Continued)

*Primary Examiner* — Neveen Abel Jalil
*Assistant Examiner* — Kellye Buckingham
(74) *Attorney, Agent, or Firm* — Fish & Richardson P.C.

(57) ABSTRACT

A method of adding web-based content to a web notebook can include producing multiple search results responsive to a search request; generating in the multiple search results multiple corresponding icons, each of which, when invoked, causes content associated with a corresponding search result in the multiple search results to be placed in a web notebook associated with a user account; and forming a correlation between one of the multiple search results and the web notebook.

72 Claims, 9 Drawing Sheets

(56) References Cited

U.S. PATENT DOCUMENTS

| | | | |
|---|---|---|---|
| 2001/0044834 A1 | 11/2001 | Bradshaw et al. | |
| 2004/0205493 A1 | 10/2004 | Simpson et al. | |
| 2004/0225716 A1* | 11/2004 | Shamir et al. | 709/204 |
| 2005/0033657 A1* | 2/2005 | Herrington et al. | 705/26 |
| 2005/0091609 A1 | 4/2005 | Matthews et al. | |
| 2005/0102630 A1 | 5/2005 | Chen et al. | |
| 2005/0154994 A1 | 7/2005 | Chen et al. | |
| 2005/0234904 A1 | 10/2005 | Brill et al. | |
| 2005/0246540 A1 | 11/2005 | Brown | |
| 2006/0015498 A1 | 1/2006 | Sarmiento | |
| 2006/0026147 A1* | 2/2006 | Cone et al. | 707/3 |
| 2006/0085476 A1 | 4/2006 | Daniels | |
| 2006/0161859 A1 | 7/2006 | Holecek et al. | |
| 2006/0274086 A1* | 12/2006 | Forstall et al. | 345/629 |
| 2006/0277460 A1 | 12/2006 | Forstall et al. | |
| 2007/0011146 A1* | 1/2007 | Holbrook | 707/3 |
| 2007/0106952 A1 | 5/2007 | Matas et al. | |
| 2007/0266022 A1 | 11/2007 | Frumkin et al. | |
| 2007/0266342 A1 | 11/2007 | Chang et al. | |
| 2008/0046845 A1 | 2/2008 | Chandra | |
| 2008/0086471 A1 | 4/2008 | Ritter et al. | |
| 2008/0168388 A1 | 7/2008 | Decker | |
| 2008/0201650 A1 | 8/2008 | Lemay et al. | |
| 2008/0307301 A1 | 12/2008 | Decker et al. | |
| 2008/0307308 A1 | 12/2008 | Sullivan et al. | |
| 2009/0044138 A1 | 2/2009 | Rudolph et al. | |
| 2009/0119258 A1 | 5/2009 | Petty | |
| 2011/0082849 A1 | 4/2011 | Rakowski et al. | |
| 2013/0212463 A1* | 8/2013 | Pachikov et al. | 715/234 |

OTHER PUBLICATIONS

International Search Report & Written Opinion, PCT/US2007/068662, mailed Oct. 31, 2007 13 pages.
International Preliminary Report on Patentability & Written Opinion, PCT/US2007/068695, mailed Nov. 20, 2008, 8 pages.
International Search Report & Written Opinion, PCT/US2007/068662, mailed Nov. 6, 8007, 12 pages.
International Preliminary Report on Patentability & Written Opinion, PCT/US2007/068662, mailed Nov. 20, 2008, 7 pages.
International Search Report & Written Opinion, PCT/US2007/068709, mailed Nov. 8, 2007, 14 pages.
International Preliminary Report on Patentability & Written Opinion, PCT/US2007/068709, mailed Nov. 20, 2008, 8 pages.
Amazon Screenshot, So You'd Like to . . . Create a Guide, Retrieved from Internet, [retrieved on Mar. 22, 2006] 2 pages.
Amazon.com, Inc., Amazon Listmania, Copyright 1995-2005, [online], [retrieved on Mar. 22, 2006] Retrieved from Amazon.com using Internet <URL: http://www.amazon.com/gp/help/customer/display.html?nodeId=14279651> 8 pages.
Backpack Publish Firefox Extension << Slow Burn Productions [online], [retrieved Jul. 16, 2007] Retrieved from Internet <URL: http://slowburnproductions.wordpress.com/2007/04/25/backpack-publish-firefox-extension> 4 pages.
Citebite—Link directly to specific quotes in web pages [online], [retrieved Jul. 16, 2007] Retrieved from Internet <URL: http://www.citebite.com> 2 pages.
Clipmarks—Learn More [online], [retrieved Jul. 16, 2007] Retrieved from Internet <URL: http://www.clipmarks.com/learn-more> 4 pages.
Cogitum, L.C., Cogitum Co-Citer , Copyright 2000-2006, [online], [retrieved on Mar. 22, 2006] Retrieved from Cogitum, L.C. using Internet <URL: http://www.cogitum.com/co-tracker-text/more.shtml> 2 pages.
Dabble Video Search Launchpad [online], [retrieved Jul. 16, 2007] Retrieved from Internet <URL: http://www.http://dabble.com> 2 pages.
Diigo—Social Annotation: Seamless Integration of Social Bookmarking, Web Highlighter, Sticky-Note & Clipping [online], [retrieved Jul. 16, 2007] Retrieved from Internet <URL: http://www.diigo.com> 3 pages.

eSnips—Make your life easier with eSnips Uploader [online], [retrieved Jul. 16, 2007] Retrieved from Internet <URL: http://www.esnips.com/tour/page8.jsp>1 page.
EverNote—A single place for all your notes! [online], [retrieved Jul. 16, 2007] Retrieved from Internet <URL: http://www.evernote.com/en>, 2 pages.
EverNote Corporation, EverNote products, Copyright 2006, [online], [retrieved on Mar. 22, 2006] Retrieved from EverNote Corporation using Internet <URL: http://www.evernote.com/en/products/evernote/features.php> 7 pages.
EverNote Corporation, User Manual for EverNotes Plus, Copyright 2005, [online], [retrieved on Mar. 22, 2006] Retrieved from EverNote Corporation using Internet <URL: http://www.evernote.com/en/products/evernote/features.php> 2 pages.
Fleck.com—Fleck the Web! [online], [retrieved Jul. 16, 2007] Retrieved from Internet <URL: http://fleck.com> 2 pages.
Giles-Peters, Andrew, ScrapBook: A Firefox extension for gathering information from the web, Dec. 2005, [online], [retrieved on Mar. 22, 2006] Retrieved from Mozilla using Internet <URL: http://www.mozilla.com/en-US/firefox/central/> 55 pages.
Google Shopping List [online], [retrieved on Jun. 18, 2007] Retrieved from Internet <URL: http://froogle.com/shoppinglist>1 page.
i-Lighter :: the yellow highlighter for the web [online], [retrieved Jul. 16, 2007] Retrieved from Internet <URL: http://www.i-lighter.com> 2 pages.
Jeteye—How to Create Your First Jetpak Jeteye.com [online], [retrieved Jul. 16, 2007] Retrieved from Internet <URL: http://www.jeteye.com/jetpak/5e065b9d-db01-4b66-a523-0f6c4667b8cf> 2 pages.
Jeteye Technologies, Inc., Jeteye beta tour, Copyright 2005, [online], [retrieved on Mar. 22, 2006] Retrieved from Jeteye Technologies, Inc. using Internet <URL: http://www.jeteye.com/>.1 page.
Kaboodle—Organize [online], [retrieved Jul. 13, 2007] Retrieved from Internet <URL: http://www.kaboodle.com/ht/img/hom/promo2.gif> 1 page.
Kaboodle—Shopping is more fun with friends [online], [retrieved Jul. 16, 2007] Retrieved from Internet <URL: http://www.kaboodle.com>, 4 pages.
Kaboodle, Inc, Kaboodle , Copyright 2006, [online], [retrieved on Mar. 22, 2006] Retrieved from Kaboodle.com using Internet <URL: http://www.kaboodle.com/zd/help/learnhow.html> 5 pages.
Koonji—How to Use it [online], [retrieved on Aug. 31, 2007] Retrieved from Kaboodle.com using Internet <URL: http://www.koonji.com/learnMore.htm, 9 pages.
Lifehacker—Create a store and earn commissions with Zlio—Lifehacker [online], [retrieved Jul. 16, 2007] Retrieved from Internet <URL: http://www.lifehacker.com/software/sales/creat-a-stor-and-earn-commissions-with-zlio-234655.php> 7 pages.
Macropool GmbH, Content Saver , Copyright 2006, [online], [retrieved on Mar. 22, 2006] Retrieved from Macropool GmbH using Internet <URL: http://www.macropool.com/en/products/contentsaver/index.html> 2 pages.
Microsoft Corporation, How to change the placement of your notes in OneNote 2003, Last Review date Aug. 5, 2004, Copyright 2006, [online], [retrieved on Mar. 22, 2006] Retrieved from Microsoft Corporation using Internet <URL: http://support.microsoft.com/kb/822567> 3 pages.
Microsoft Corporation, Onfolio Add-in for Windows Live Toolbar, Copyright 2002-2006, [online], [retrieved on Mar. 22, 2006] Retrieved from Microsoft Corporation using Internet <URL: http://www.onfolio.com/product/toolbaraddin/> 2 pages.
Net Snippets Ltd, Net Snippets Maximizing Online Research , Copyright 2001-2005, [online], [retrieved on Mar. 22, 2006] Retrieved from Net Snippets Ltd using Internet <URL: http://www.netsnippets.com/professional.htm> 4 pages.
Notemark: Your Personal Save Engine, [online], [retrieved on Jul. 16, 2007] Retrieved from Notemark using Internet <URL: http://www.notemark.com/how_it_works.php> 8 pages.
Omni Group—OmniOutliner [online], [retrieved Jul. 16, 2007] Retrieved from Internet <URL: http://www.omnigroup.com/applications/omnioutliner> 5 pages.

(56) References Cited

OTHER PUBLICATIONS

Plum Ventures, Inc., Plum, Copyright 2006, [online], [retrieved on Mar. 22, 2006] Retrieved from Plum Ventures, Inc. using Internet <URL: http://www.plum.com/help.plum> 12 pages.
Plum: Welcome to Plum [online], [retrieved Jul. 16, 2007] Retrieved from Internet <URL: http://www.plum.com> 2 pages.
PreFound—Download PFfinder [online], [retrieved Jul. 16, 2007] Retrieved from Internet <URL: http://www.prefound.com/pffinder.php> 2 pages.
SharedCopy [online], [retrieved Jul. 16, 2007] Retrieved from Internet <URL: http://www.sharedcopy.com> 16 pages.
Stickis [online], [retrieved Jul. 16, 2007] Retrieved from Internet <URL: http://www.stickis.com> 1 page.
Summarizing Personal Web Browsing Sessions [online], [retrieved Jul. 16, 2007] Retrieved from Internet <URL: http://www.cs.washington.edu/homes/mirad/research/summaries> 2 pages.
Tably [online], [retrieved Jul. 16, 2007] Retrieved from Internet <URL: http://www.tably.com/defaulttab.asp> 1 page.
Trailfire [online], [retrieved Jul. 16, 2007] Retrieved from Internet <URL: http://www.trailfire.com> 4 pages.
Tucows Downloads—WebStasher 1.5 Shareware Software [online], [retrieved Jun. 18, 2007] Retrieved from Internet <URL: http://www.tucows.com/preview/319605>, 5 pages.
Uhuroo—Help Kaboodle [online], [retrieved Jul. 16, 2007] Retrieved from Internet <URL: http://www.uhuroo.com/uweb/html/help/htm> 5 pages.
WebWorkshop—Google's PageRank Explained [online], [retrieved Mar. 23, 2006] Retrieved from Internet <URL: http://webworkshop.net/pagerank.html?prn=y, 15 pages.
Welcome to webOutliner [online], [retrieved Jul. 16, 2007] Retrieved from Internet <URL: http://www.weboutliner.com> 2 pages.
Wists, Wists social shopping beta, [online], [retrieved on Mar. 22, 2006] Retrieved from wists.com Internet <URL: www.wists.com> 3 pages.
Wridea [online], [retrieved Jul. 16, 2007] Retrieved from Internet <URL: http://www.wridea.com> 3 pages.
Yoono, People Powered [online], [retrieved Jul. 16, 2007] Retrieved from Internet <URL: http://www.yoono.com/index.jsp> 1 page.
Zoho Notebook Press Release [online], [retrieved Aug. 31, 2007] Retrieved from Internet <URL: http://mashable.com/2007/05/21/zoho-notbook > 1 page.
Zotero—The Next-Generation Research Tool [online], [retrieved Jul. 16, 2007] Retrieved from Internet <URL: http://www.zotero.org>, 5 pages.
Manber, U. "Creating a Personal Web Notebook," *Proceedings of the Usenix Symposium on Internet Technologies and Systems*, Dec. 11, 1997, pp. 183-191, Monterey, CA, USA, Retrieved from the Internet: URL: http://www.usenix.org/publications/library/proceedings/usits97/full_papers/manber_creating/manber_creating.pdf .[retrieved on Oct. 24, 2007] abstract.
Reimer, Y. J. et al., "Implementation Challenges Associated with Developing a Web-based E-notebook," *Journal of Digital Information* [Online] vol. 4, No. 3, 2004, ISSN: 1368-7506, Retrieved from the Internet URL:http://jodi.ecs.soton.ac.uk/Articles/v04/i03/JacobsReimer/. [retrieved on Oct. 24, 2007] section 3 "NetNotes: A Web-based E-Notebook".
Sugiura, A. et al. "Internet Scrapbook: Automating Web Browsing Tasks by Demonstration," *Proceedings of the 11th Annual Symposium on User Interface Software and Technology*, Nov. 1-4, 1998, pp. 9-18, San Francisco, CA, USA, ISBN: 1-58113-034-1.
Engst, A.C., "Internet Explorer 5.0 Redisplays the Web," Internet Article [Online] Mar. 27, 2000, Retrieved from the Internet: URL: http://db.tidbits.com/article/5872>[retrieved on Oct. 25, 2007] Paragraph titled "Keeping a Scrapbook".
"Bluebell—Internet Scrapbook—1U5" Internet Article [Online] Feb. 26, 2002, Retrieved from the Internet: URL: http://www.download32.com/bluebell---internet-scrapbook--i22878.html> [retrieved on Oct. 25, 2007].
European Patent Office Action, Appl. No. EP 07 762 103.5, mailed Mar. 18, 2009, 4 pages.
Notification of First Office Action, Chinese Appl. No. 200780026084.4, issued Jul. 12, 2010, 24 pages.
Notification of Second Office Action, Chinese Appl. No. 200780026084.4, issued Apr. 14, 2011, 26 pages.
CN Office Action in Application No. 200780026182.8, mailed Nov. 22, 2010, 14 pages.
Susan Dumais et al. "Stuff I've Seen: A System for Personal Information Retrieval and Re-Use," Microsoft Research, Redmond, WA, 2003, 8 pages.
Decision on Rejection, Chinese Appl. No. 200780026084.4, issued Sep. 21, 2011, 18 pages.
European Examination Report, EP 07 783 616.1, mailed Jan. 4, 2012, 4 pages.
CN Office Action in Application No. 200780026182.8, issued Nov. 23, 2011, 17 pages.

* cited by examiner

MANAGING AND ACCESSING DATA IN WEB NOTEBOOKS

CROSS-REFERENCE TO RELATED APPLICATIONS

This document claims the benefit of prior U.S. provisional application 60/799,476, filed May 10, 2006.

TECHNICAL FIELD

This document relates to managing and accessing data in online notebooks.

BACKGROUND

Surfers of the World Wide Web can locate all forms of information, from travel guides to restaurant home pages. Effective search engines can help a user find the best or most relevant of all such web pages. The user may then click on search results and be taken to the web pages, where the user may then navigate to find particularly helpful information. After browsing content from various sources, the user may wish to return to content previously accessed. To do so, the user may employ a "history" or "favorites" feature of a browser running on the client device. However, the user may need to re-navigate the information—perhaps passing again through irrelevant or unwanted information to get to the desired information.

Web notebooks may allow a web surfer to organize web-based information. A web notebook is a document that compiles portions of content from various other web documents. A web user may create a web notebook by selecting content relating to a particular topic as they surf the web. For example, someone planning to build a new home may create a web notebook related to homebuilding, surf to a number of web sites of hardware (e.g., plumbing, lighting, etc.) manufacturers and select content from each manufacturer to be compiled in the web notebook. In this way, the user may be provided with a convenient location in which to store and review content on a particular topic relatively easily.

SUMMARY

This document discusses systems, methods and techniques for managing web notebooks. In general, mechanisms are discussed by which a search result, content such as metadata relating to a search result, or other web content can be placed into a web notebook. In addition, methods and systems for providing users with access to relevant notebooks are also discussed. For example, a search engine can search among the corpus of a group of web notebooks, such as in a manner similar to searching for other web content. Alternatively, searching can occur among web pages, and a user can be provided with links to web notebooks that reference those pages (i.e., notebooks that contain content from those pages).

A computer-implemented method of adding web-based content to a web notebook can include producing multiple search results responsive to a search request; generating, in the multiple search results, multiple corresponding icons, each of which, when invoked, causes content associated with a corresponding search result in the multiple search results to be placed in a web notebook associated with a user account; and forming a correlation between one of the multiple search results and the web notebook.

In some implementations, at least one of the multiple corresponding icons comprises a textual description. Each of the multiple corresponding icons can be associated with exactly one corresponding search result. In some implementations, at least one of the multiple search results can be selected from the group consisting of an image search result, a text search result, a scholarly article search result and video search result. In some implementations, at least one of the multiple search results can a map search result. In some implementations, at least one of the multiple search results can be a shopping search result. In some implementations, at least one of the multiple search results can be a book search result.

Forming a correlation can include identifying a web notebook by matching content in one of multiple existing web notebooks associated with the user account to a characteristic of the search result. The characteristic of the search result can include textual content of web documents associated with the search result or keywords associated with a document related to the search result. The content in the one of multiple existing web notebooks can include user-supplied titles, headings or annotations in the existing web notebooks. The content in the one of multiple existing web notebooks can include content that was placed in the one of multiple existing web notebooks in response to user-invocation of an icon associated with a corresponding search result. Producing the list of multiple search results can include applying the search request to an index containing content from web notebooks.

In some implementations, the computer-implemented method can further include displaying an identified web notebook. In some implementations, the computer-implemented method can further include clipping at least part of one of the multiple search results into a web notebook. In some implementations, the computer-implemented method can further include associating the at least one icon with content that was reviewed in the document corresponding to the search result. In some implementations, the computer-implemented method can further include displaying a preview of the content associated with the at least one icon and providing a user an opportunity to accept the content. The computer-implemented method can further include receiving input that identifies the user account.

In some implementations, the correlation is formed only after input is received from a user selecting one of the multiple corresponding icons. At least one of the multiple corresponding icons can be generated only after input has been received to access a document referenced by one of the multiple search results. At least one icon can be generated only after a document corresponding to the one search result has been accessed for a period greater than a predetermined time period.

In some implementations, a computer-implemented method of presenting search result information for review by a web user can include generating a plurality of search results responsive to a search request; identifying one or more web notebooks associated with search results in the plurality of search results and with a user account; and transmitting for use by a client computer associated with the user account the plurality of search results along with one or more links for accessing the associated web notebooks.

The transmitted information can be the content of a web notebook where only the web notebook is associated the one or more links. The transmitted information can be a list of links to a plurality of notebooks. The list of links can include titles of the one or more notebooks.

In some implementations, the computer-implemented method can further include receiving a selection of a link for accessing one or more associated web notebooks and transmitting information regarding the one or more associated notebooks to a server computer that stores the one or more associated web notebooks. In some implementations, the computer-implemented method can further include receiving input identifying the user account.

The general and specific aspects can be implemented using a system, a method, or a computer program, or any appropriate combination of systems, methods, and computer programs. The details of one or more implementations are set forth in the accompanying drawings and the description below.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1A:
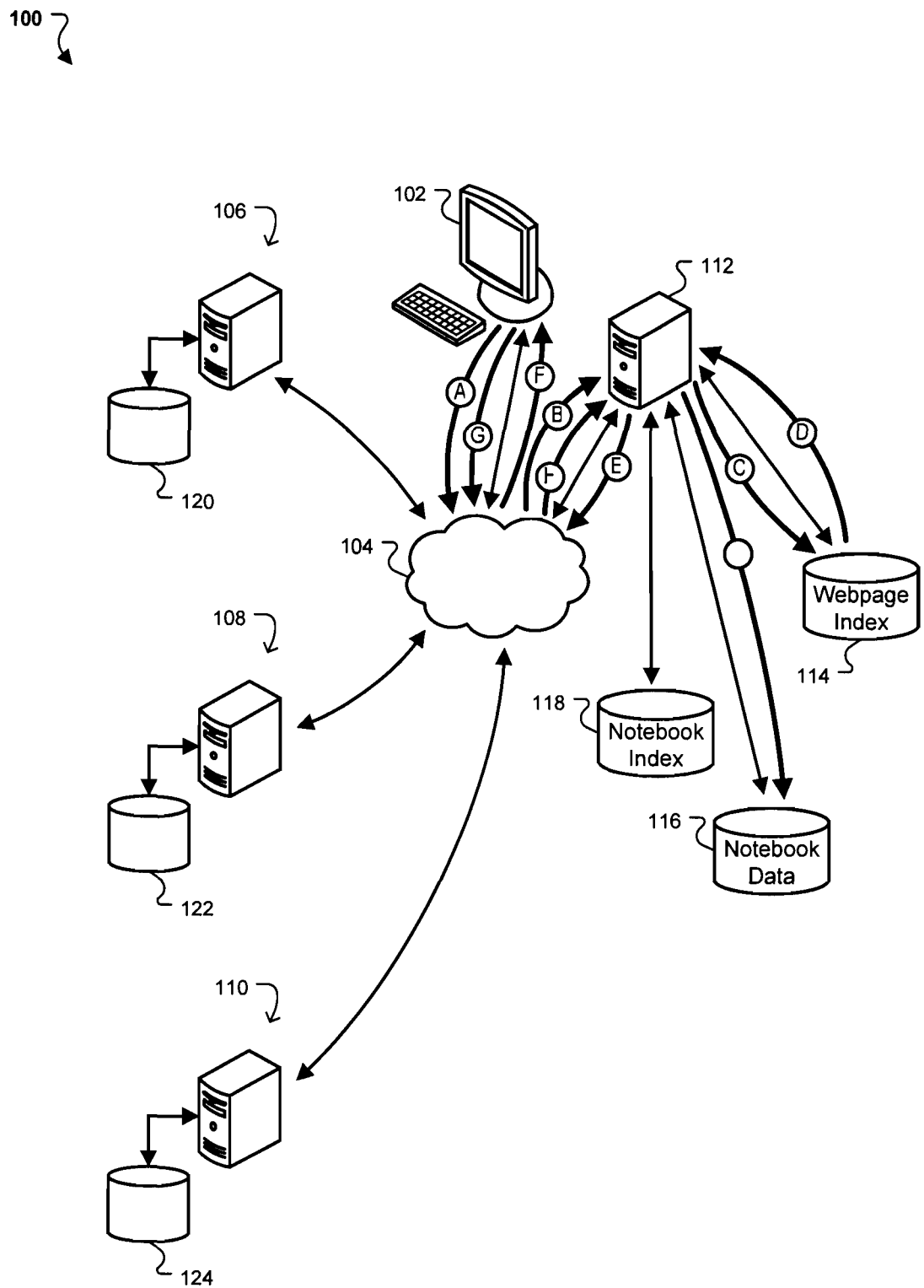
FIG. 1A is an example computer environment in which a user can browse web pages and clip selected web content from the web pages for inclusion in web notebooks.

FIG. 1A is an example computer environment 100 in which a user can browse web pages and clip selected web content from the web pages for inclusion in web notebooks. In operation, web notebooks can be employed by the user to log various websites that the user has visited and to clip and save portions of content from the various websites in a web notebook. Some users may employ web notebooks to organize content from various sources related to a particular subject. Each user may keep a number of web notebooks, with each directed to one subject.

Web notebooks can also be shared between and among users. For example, a user can make a web notebook available for searching, and for access by the other users. In addition, users can provide write access to one or more of their web notebooks. In such a situation, other users may be selectively provided with write access. For example, top-level access may permit a user to edit another user's notebook and add content to it. Lower level access may provide a user with the ability to add comments and other notes to a web notebook.

In general, the computer environment 100 includes a client computer 102 coupled to a network 104, such as the internet. The client computer 102 provides an electronic interface through which the user can access content from other devices coupled to the network 104. Such content can be stored on various servers, such as, for example, web servers 106, 108 and 110. In particular, the content can be stored in data stores 120, 122 and 124, included in or coupled to the servers 106, 108 and 110. The content in this instance can include web pages in a standard mark-up language and other similar documents.

The content can be directly or indirectly accessible from the client device 102. For example, to directly access content that is stored on a server, a user of the client device 102 can enter an address associated with the server in a browser running on the client device 102 (e.g., a URL (universal resource locator) address), and a browser can access content from the corresponding server, via the network 104, using the address. As another example, the user of the client device 102 can access content indirectly through an information provider 112 that accepts queries, searches for content responsive to the queries, and delivers the responsive content to the client device 102.

To provide content responsive to a query, the information provider 112 can maintain indices of content that is accessible from the network, such as content (e.g., web pages) on servers 106, 108 and 110. For example, if a user wants to find specific information that covers a particular subject, the user can employ a browser on the client device 102 to enter a search query related to the particular subject and transmit the search query to the information provider 112. Once the query has been transmitted over the network and received by the information provider 112, the information provider 112 can use the query to find corresponding web content, for example, on the servers 106, 108 and 110. In particular, the information provider 112 can use a search engine and a corresponding index 114 to locate content responsive to the user's search query.

The index 114 can include metadata for various web documents indexed over time by an automated information gatherer associated with the information provider 112, such as a crawler or a spider. The information gatherer can continuously or almost continuously obtain and index new information from sources connected to the network 104. For example, as content is modified or added to the servers 106, 108 or 110, the information provider 112 can update the index 114.

The user can browse several web documents that are returned by the information provider 112 in response to the query. While browsing the web documents, the user may benefit from a mechanism for clipping portions of content from the several web documents and managing notes or links related to the web documents. Web notebooks can provide such a mechanism. Notes about websites can include text summaries extracted from the search results, as well as other information (e.g., metadata related to a corresponding search query, a time/date stamp, links to the web documents, etc.). Each notebook can be made up of a number of notes in addition to other content, such as content created by the person who compiles the notebook, and also headings or annotations (e.g., user-entered headings or annotations) and other navigation content for the notebook.

Web notebooks can be stored in a data store 116 that is included in or coupled to the information provider 112. As will be described in more detail with reference to other figures, the data store 116 can include web notebooks associated with various users who have stored portions of web content extracted from different websites. The web notebooks can be stored in a distributed manner or centrally hosted. Hosted storage may provide a variety of advantages. For example, the notebook data may be accessed easily by multiple users and may be accessed by a single user from a variety of computers. Moreover, hosted information may be more easily searched and analyzed.

The information provider 112 can also include a notebook index 118 for indexing the content in the web notebooks. The notebook index 118 can contain links to the notebooks and to the web pages associated with the content in the web notebooks. In particular, the content can correspond to web pages stored in the servers 106, 108 and 110. The notebook index 118 can also be combined with the web page index 114 (e.g., by treating the various notebooks as additional instances of web pages).

One example method of capturing information in notes, as well as managing the notes in web notebooks, is now described in more detail. Lettered arrows are shown to assist in understanding the flows of information in the example method. Other steps can be performed, steps can be eliminated, and steps can be modified as appropriate.

To access content stored on the servers 106, 108 and 110, the user can initially enter a search query in a web browser running on the client device 102. The browser can send the search query through the network 104 to the information provider 112, via paths A and B. The information provider 112 can use its search engine to execute a search of the web page index 114, via path C, based on the search query. Execution of the search can identify search results corresponding to web pages stored in the servers 106, 108 and 110, and information provider 112 can return the search results to the client device 102, via paths D, E and F. The browser can display the search results on the client device 102.

The user can then review and clip various content from the search results and save the content in a web notebook. To clip content, the user can select a control, such as an "add note" button that may be adjacent to the desired summary, as is illustrated with reference to FIGS. 2 and 3. Selecting the control can cause the information provider 112 to add corresponding content to a web notebook, via paths G, H and I. Where a user selects a search result for addition to a notebook, the added content can include a hyperlink to the site, a snippet from the site, and a URL for the site.

Determination of the particular notebook to which to add the note may have been previously made. For example, the user of the client device 102 may have been required to log in to the information provider 112 in order to access his or her notebook. That is, a web notebook can be associated with a particular user account. In some implementations, once a user logs into a user account from a particular client device, the user account can be associated with that client device (e.g., through use of a cookie, or by an identifier associated with the client device) for a particular period of time (e.g., the duration of a user session, for a predetermined duration of time, until the user logs out, etc.). Subsequently, the user may be able to access his or her user account (and associated web notebook (s)) from another client device. Moreover, the first time the user selects content to be added to a notebook, the information provider 112 may solicit input from the user to identify a specific notebook from one or more notebooks the user may already have, or to create a new notebook to which to add the note. A user may also log in more generally with the information provider 112, and may the information provider may track the user's activities in order to associate appropriate user accounts with services the users accesses.

In some implementations, web notebooks are accessible by multiple users. For example, while clipping notes into web notebooks, the user may decide to share the notebook with other users, as noted above. In particular, this decision to share the notebook can be captured by the user entering input that causes the information provider 112 to grant access to the notebook to other users. The designation that the web notebook is to be shared with other users can be stored as notebook-related metadata in the notebook index 118.

Figure 1B:
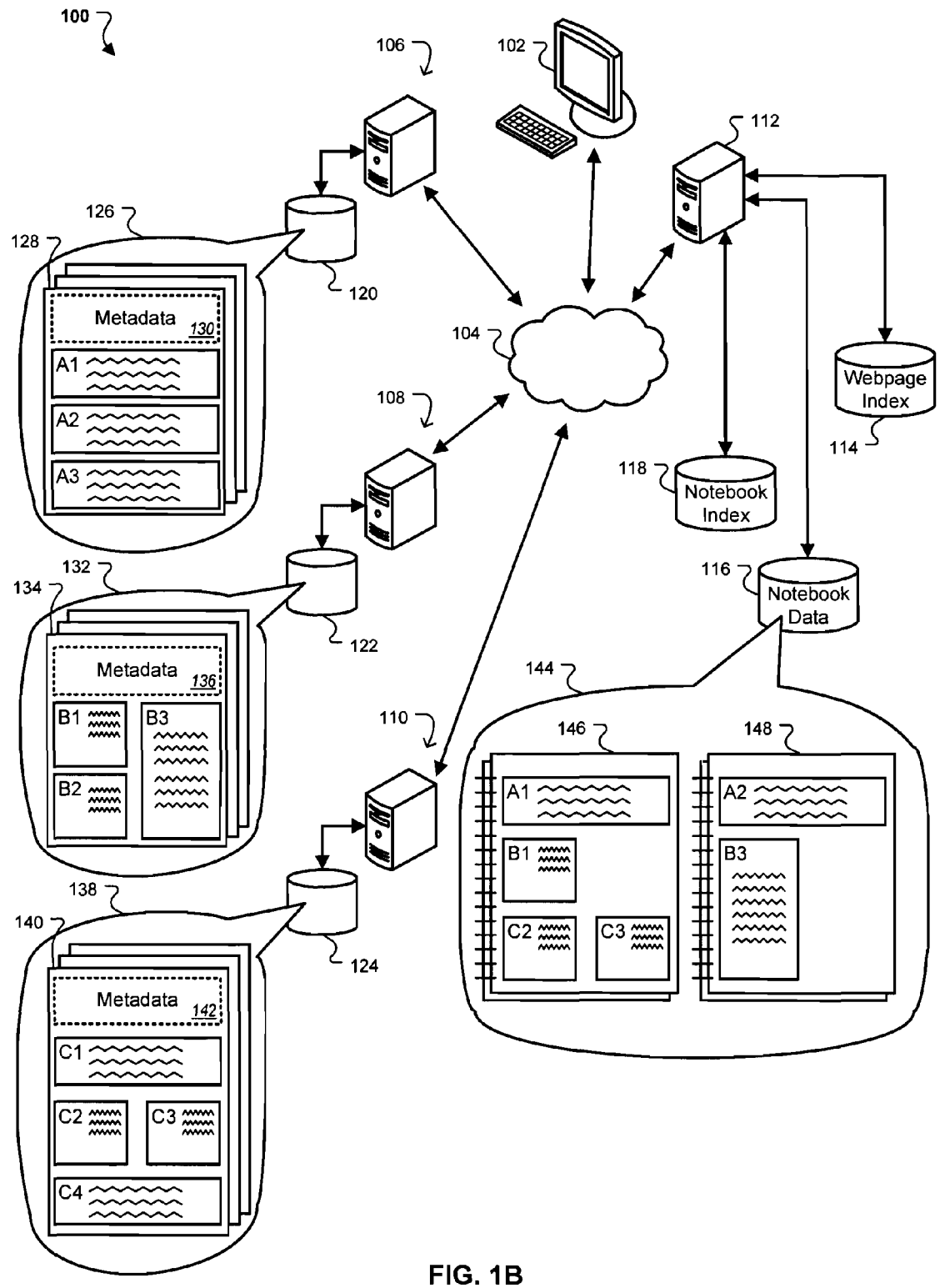
FIG. 1B illustrates additional details of the example environment that is shown in FIG. 1A.

FIG. 1B illustrates additional details of the example environment 100 that is shown in FIG. 1A. In particular, FIG. 1B illustrates example content in the various servers 106, 108 and 110, and content in example notebooks 146 and 148, which can store clipped portions of content from the servers 106, 108 and 110.

In general, the servers 106, 108 and 110 can provide access to web content for corresponding web domains. Documents stored on the servers 106, 108 and 110 may contain various multi-media content (e.g., text, graphics, video, etc.) corresponding to a theme of each web domain. For example, document 128, which is stored on the server 106, may contain content for the web domain www.hawaii.com that relates to travel to and throughout Hawaii; document 134, which is stored on the server 108, may contain content for the web domain www.bestplaceshawaii.com that relates to travel tips for vacations in Hawaii; and document 140, which is stored on the server 110 may contain content for the web domain www.hawaii-aloha.com that also includes Hawaii vacation information.

As shown, the document 128 has various portions A1, A2 and A3, each representing specific portions of web content related to the document 128. In particular, the content portions A1, A2 and A3 may represent individual sections of a web page accessible from www.hawaii.com. Similarly, content portions B1, B2 and B3 may represent individual portions of a web page accessible from www.bestplaceshawaii.com; and content portions C1, C2, C3 and C4 may represent individual portions of a web page accessible from www.hawaii-aloha.com. Each portion can represent a different kind of content. For example, A1 may represent text; A2 may represent an image; and A3 may represent a video clip. Other types of content are contemplated, such as, for example, content related to books, videos, scholarly articles maps, etc. In some implementations, a user can clip and include in web notebooks the various content portions. Web notebooks are now described in greater detail.

The information provider 112 can store web notebooks 144 in the database store 116. The notebook data can include associated web content clipped from various web documents stored on the servers 106, 108 or 110. In particular, example notebook 146 is depicted as including portion A1, clipped from the document 128 on the server 106; portion B1, clipped from the document 134 on the server 108; and portions C2 and C3, clipped from the document 140 on the server 110. Similarly, notebook 148 is depicted as including content clipped from portion A2 in the document 128 and the portion B3 from the document 134. In addition, notebook 148 can include a pointer to a web page such as document 128, so that the notebook displays dynamic content by accessing the current content at the particular web page each time the notebook is called.

Figure 2:
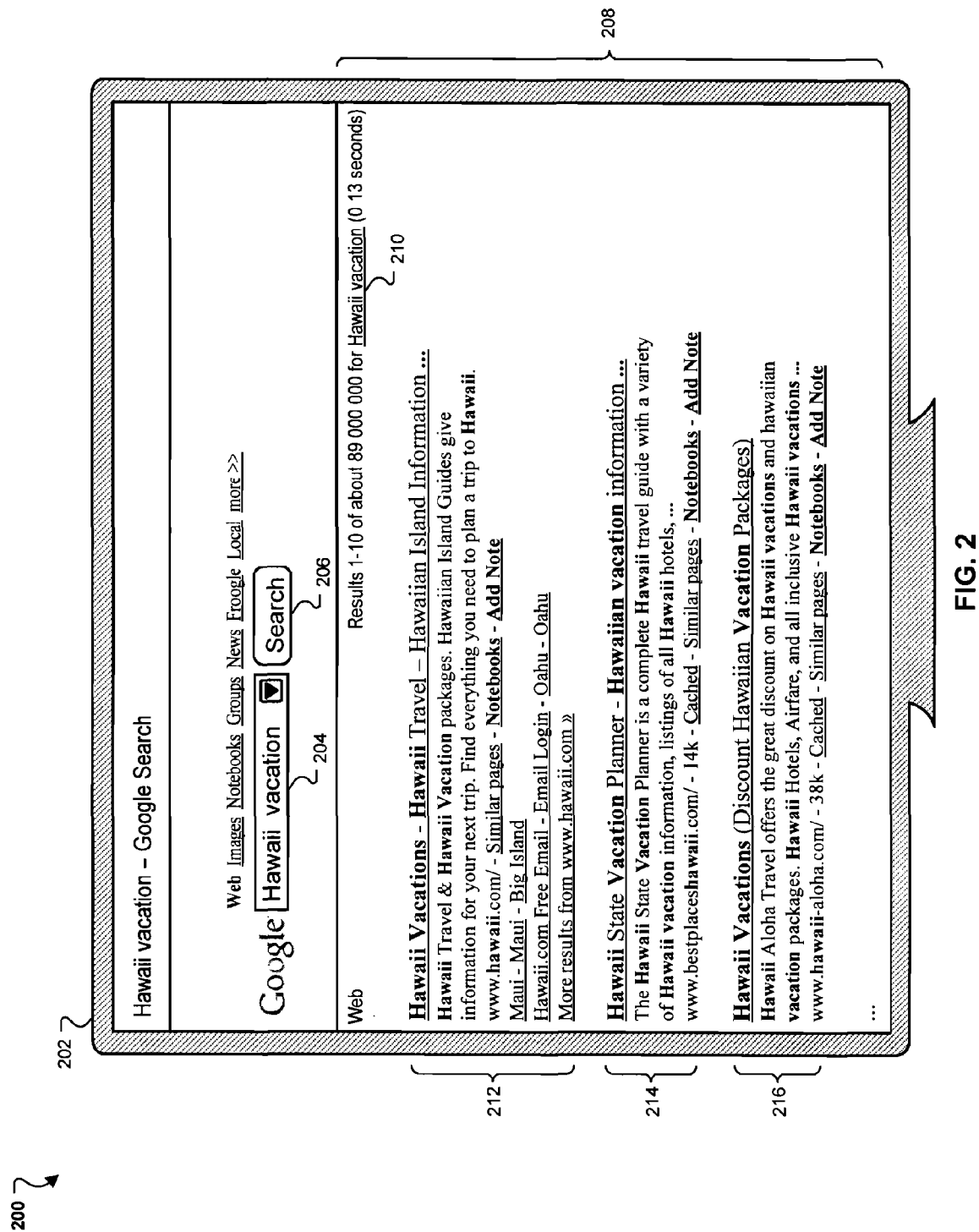
FIG. 2 is an example screenshot of results that may be supplied by an information provider in response to a query received from a client device.

FIG. 2 is an example screenshot of results that can be supplied by the information provider 112 in response to a query received from the client device 102. In general, FIG. 2 shows a form of presenting search results that permit a user to add a search result or other related material to a web notebook, and can also permit a user to open a new web notebook or add to a notebook from a search result.

The results can be displayed in a browser window 202, which the user can employ to access documents and to clip web content into web notebooks. For example, referring to FIGS. 1A and 1B, the screen 202 can be displayed on the client device 102. If the user of the computer 102 is planning a trip to Hawaii, the user may enter a search query 204

"Hawaii vacation" to obtain search results matching the request. Once corresponding results are displayed in the screen 202, the user can clip corresponding content for inclusion into a web notebook, such as the web notebook 144. The search results can be provided by the information provider, which may use the index 114 to locate web documents matching the user's search query.

Users may prefer employing the information provider 112 to locate web documents, rather than directly accessing web documents by submitting corresponding addresses in a browser. For example, the user may not know the exact websites or web documents that will contain the requested information, but may employ the information provider 112 to quickly locate pertinent sites and documents, which the information provider 112 can further rank by relevance.

The user can initiate a query on an interface depicted by screen 202 by entering a search string in the query field 204. For example, as described above, if the user is planning a trip to Hawaii, the user may enter "Hawaii vacation" to find websites that contain information useful for planning a trip to Hawaii. The user can then select a search control button 206, which can cause the web browser to send the search request to the information provider 112.

The information provider 112 can then use its search engine and index to locate pertinent results and create a list of such results. The information provider can send the list of search results, via the network 104, to the client device 102 for display in the browser 202. A results area 208 can include a results summary 210 of the search—for example, displaying the number of results or reporting the number of results in the result set. The results area 208 can also include summaries of the web content matching the search query, in the form of snippets. For example, as a result of launching a search for "Hawaii vacation" from the web browser (e.g., from an initial search screen—not shown), the user can be presented with the screen 202 containing results 212, 214 and 216 for various websites that contain information pertinent to Hawaii vacations. As shown, the result 212 corresponds to www.hawaii.com; the result 214 corresponds to www.bestplaceshawaii.com; and the result 216 corresponds to www.hawaii-aloha.com. Upon reviewing these search results 212, 214 and 216, the user may desire to clip certain content and add that content to a web notebook. This process is now described with reference to FIG. 3.

Each of the search results in the Figure are also shown to have two notebook-related links, labeled "Notebooks" and "Add Note." The former link, when selected, can cause to be displayed links pointing to notebooks associated with the web page in the search result. A selection of the "Add Note" link can cause the information shown for that search result, a URL to the search result, or other such information to be added to a web notebook. Each feature is described in more detail below.

In one implementation, the "Add Note" link is initially absent from a search result. However, if a user selects the search result, browses that result, and then returns to the search result page, the "Add Note" link can be added to the search results display. Such a feature can be provided for users who may not initially be interested in using a result as notebook content, but who, after reviewing the web page or other document decide to clip corresponding content. The "Add Note" link can also be provided if the user spends a predetermined amount of time at the search result, indicating that the user may have been interested in the result.

When the user has visited a search result, the system can also determine the content viewed by the user, such as by determining the extent of the content (e.g., underlying HTML code) in a web page that was displayed to the user. Such content can be associated with the "Add Note" button when the user returns to the search result. As such, when the user selects "Add Note," specific content from the document corresponding to the search result, rather than the search result itself, can be clipped into a notebook. When the user selects "Add Note," content to be clipped can be displayed to the user so that the user can confirm whether it is the content intended to be clipped to the notebook.

Figure 3:
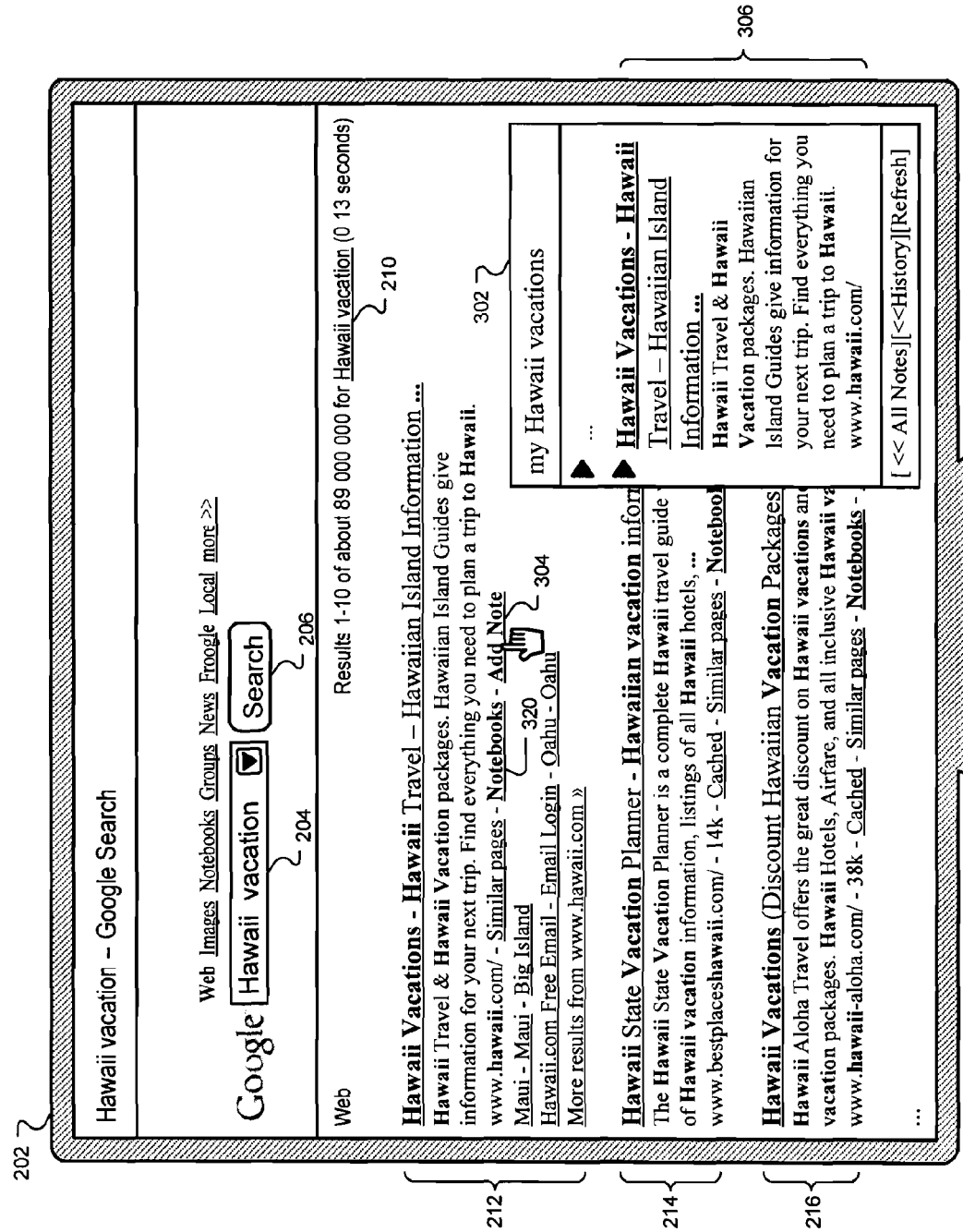
FIG. 3 illustrates a portion of a web notebook to which content can be added in response to a user selection of a control associated with a search result.

FIG. 3 illustrates a portion 302 of a web notebook that can receive content in response to a user selection of a control 304 associated with a search result. The portion can be presented in the form of a surfalong window that resides in or near the main content display area of a browser, and can show notebook entries as they are made to a notebook. Various other forms of presenting notebooks or portions of notebooks can also be employed.

Upon selection, a control 304 can cause content 306 to be added to the notebook 308. The added content 306 can be descriptive text, links, or other multimedia content that corresponds to, or is displayed adjacent to, the control 304. A separate control 304 can be provided for each of the search results. Although FIG. 3 depicts that a search title, snippet, and URL has been clipped, other content can also be clipped. In some implementations, a user can subsequently annotate particular snippets, URLs, clipped content, or a notebook in general. For example, a user could add section headings to delineate or organize different snippets, add titles to web notebooks, add annotations to various portions of a notebook, etc.

The portion 302 shown can correspond to one of several notebooks accessible to a user account or a client device. If a user is logged into an account associated with the information provider 112, the portion 302 may correspond to a default notebook for the user, such as the most recently accessed notebook. If the user has multiple notebooks, the user may be prompted select one notebook from a list of notebooks. If the user has no notebooks, the user may be prompted to create a new notebook. If the user is not logged into the information provider 112, the system may prompt the user to log into a user account, or the system may provide the user with a default notebook associated with the user's machine.

Figure 4:
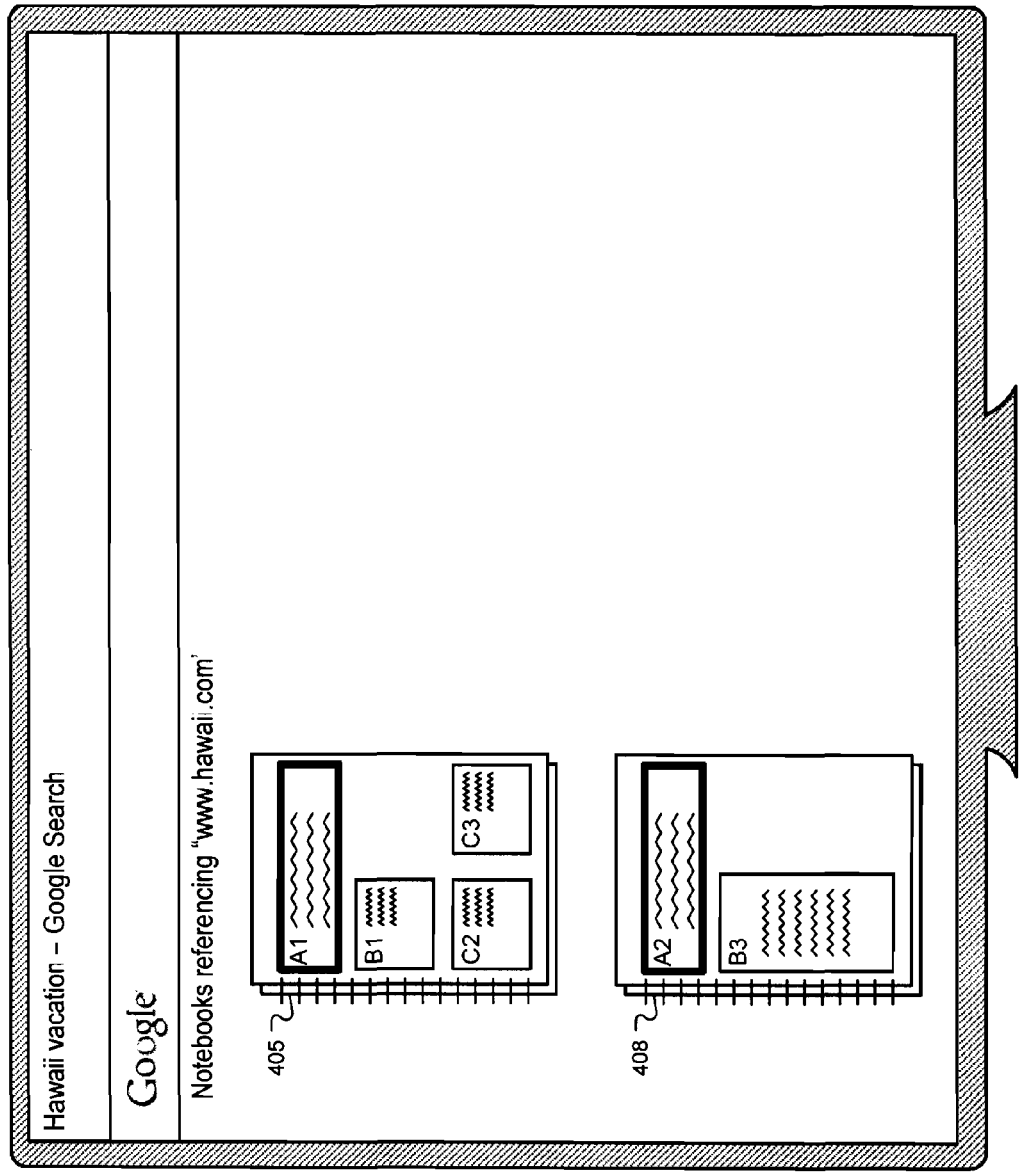
FIG. 4 is an example screen shot showing web notebooks corresponding to a search result.

FIG. 4 is a screen shot 402 showing example web notebooks 405 and 408. As shown, the notebooks include content that has been clipped from search results or from documents associated with search results. Although shown like bound notebooks in the figure, the notebooks can be displayed in any appropriate manner, such as in a list of notebooks titles and the like.

In some implementations, the notebooks 405 and 408 can be displayed in response to user selection of the "Notebooks" control 320 that is shown in FIG. 3. If a user selects the "Notebooks" control 320 corresponding to the search result 212, the screen 402 can display notebooks 128 and 134, both of which are depicted as including contain content clipped from a web domain corresponding to a first search result (www.hawaii.com) (See also FIG. 1B). Referring to FIG. 1B, the notebook 405 includes a portion A1, clipped from a web document 128 from www.hawaii.com, which may contain information on vacations in Hawaii; the notebook 408 includes a portion A2, also clipped from the web document 128. The web notebooks displayed on the screen 402 may include the user's own notebooks and/or public notebooks to which the user has write access.

Users may readily navigate to and through web notebooks. For example, a user can select a notebook and be presented with content from that notebook. The user may then select certain content within the notebook for placement in another notebook, or may select the content in order to be taken to the corresponding web page, from which the user again can clip content for one or more notebooks.

Figure 5:
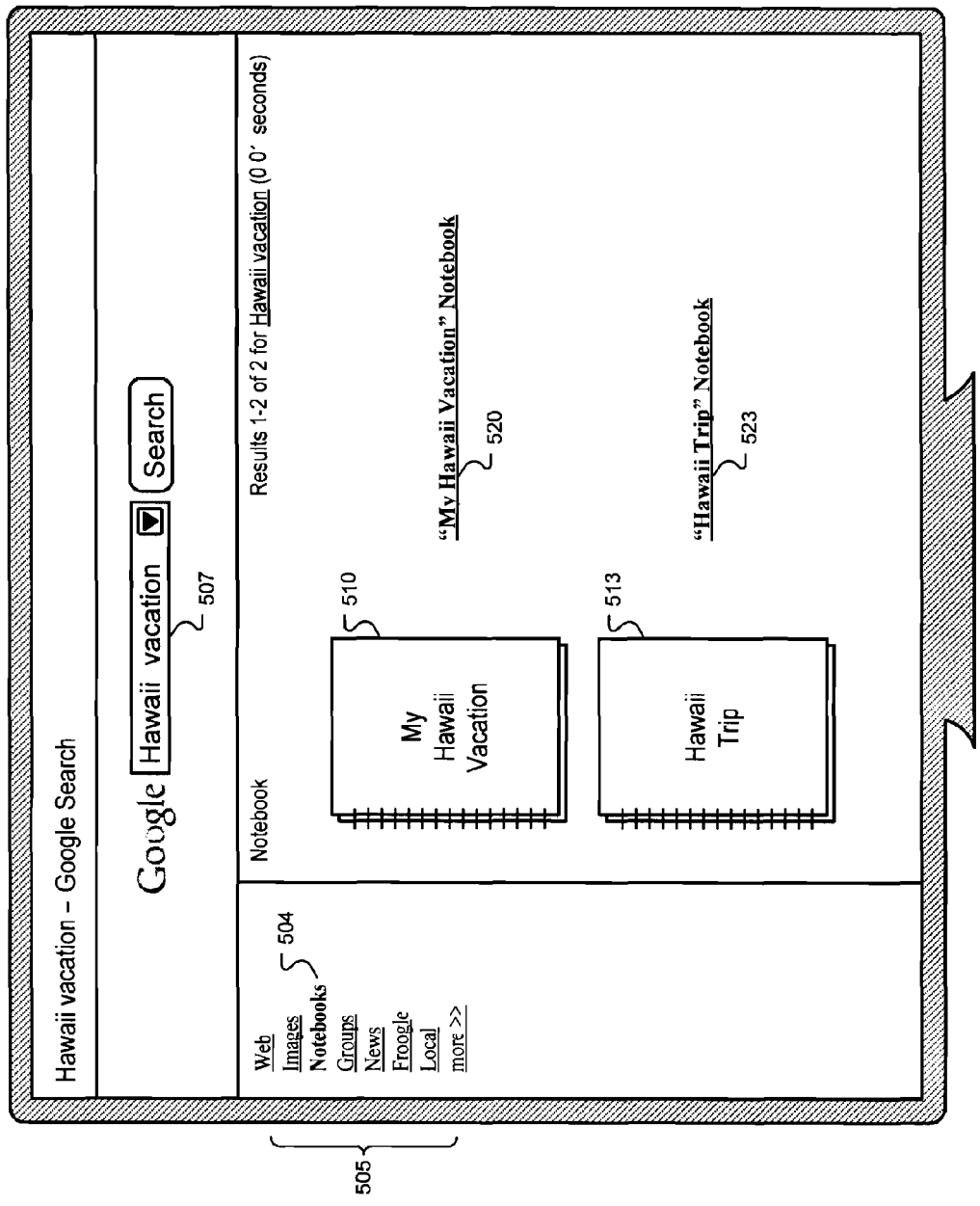
FIG. 5 is an example screen shot showing web notebooks that are responsive to a search query within a "Notebooks" domain of an information provider.

FIG. 5 is an example screen shot 502 showing web notebooks that are responsive to a search query within a "Notebooks domain" of an information provider. In general, FIG. 5 shows search results for a search focused on web notebooks only, along with a graphical interface directed to notebooks. Alternatively, notebooks corresponding to a query can be identified in another manner such as by finding search results from web documents, and then identifying notebooks that have clipped content from those web documents.

The "Notebooks domain" 504 can be one domain of several domains 505 provided by the information provider 112, and related to a particular type of content. For example, the information provider 112 may support separate domains or corpora for images, news, text, notebooks, videos, books, scholarly articles, maps, product or service information, etc. (e.g., as depicted in part in FIG. 2). Further depicted is a user's entry of the search "Hawaii vacation" in the search box 507 of the Notebooks domain 504. If the same query had been entered in the "Web" domain, the search results could have appeared as shown in FIG. 3. In either case, the displayed results may be responsive to the query entered in the search box 507.

Notebook 510 is an example of one notebook that is responsive to the query "Hawaii vacation"; that is, the notebook 510 includes content or a title matching the query "Hawaii vacation." Each notebook can have a name; for example, as shown, the notebook 510 is named "My Hawaii vacation." The manner of displaying the notebooks may vary depending on the system, and the approach shown in FIG. 5 is merely one example of an interface that can be used for presenting a group of notebooks.

Although two notebooks 510 and 513 are shown in FIG. 5, other notebooks also can be displayed if they are indexed by the information provider 112 and responsive to the search query. Moreover, although the notebooks 510 and 513 are depicted graphically, they also can be represented by links 520 and 523. Upon selecting a graphic (e.g., 510 or 513) or a link (e.g., 520 or 523), contents of the corresponding notebooks can be displayed. In some implementations, both graphics and links can be selectable for displaying web notebook contents.

Figure 6:
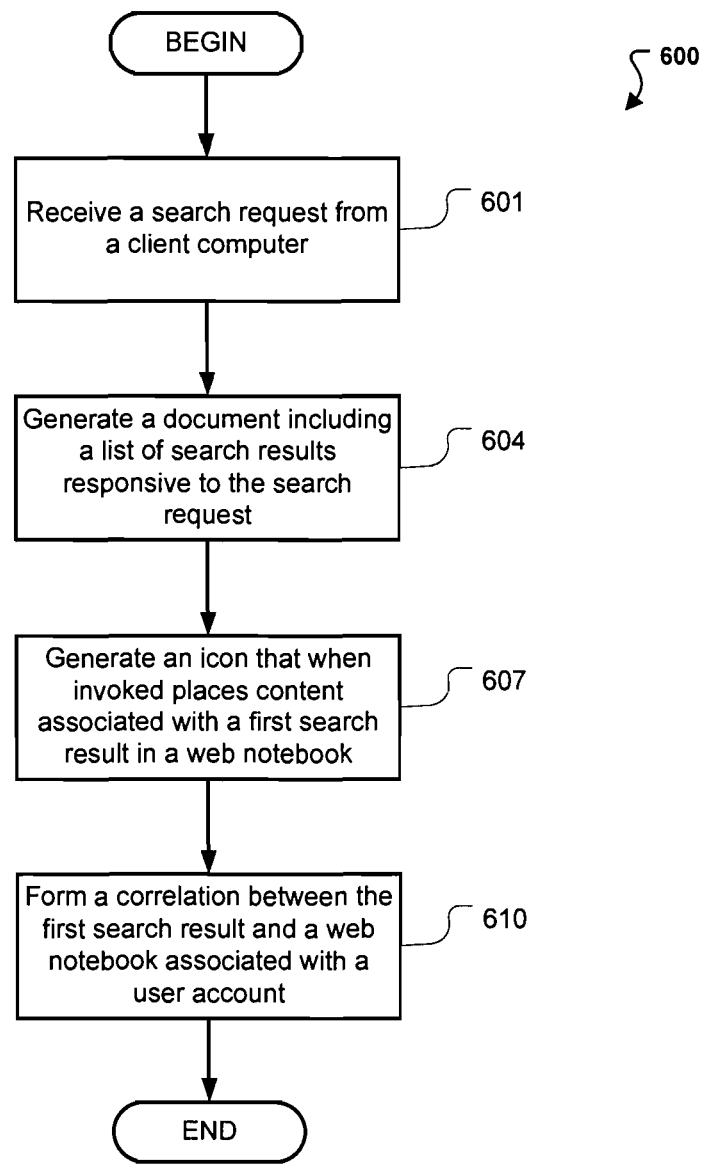
FIG. 6 is a flow diagram of an example method of adding content to a web notebook.

FIG. 6 is a flow diagram of an example method 600 of adding content to a web notebook. The method 600 can be implemented by an information provider (e.g., the information provider 112), in response to input received from a client device (e.g., client device 102). In operation, the method 600 can allow a user to clip content easily from search results responsive to a search query and store the clipped content in a web notebook.

The method 600 includes receiving (601) a search request from a client computer. For example, the information provider 112 may receive a search request from the client device 102 for information related to "Hawaii vacations." Moreover, the search request can be associated with a specific user account (e.g., as described above, a user may have previously logged into an interface through which the search request is received by the client computer, thereby enabling the identification of a specific user account).

The method 600 includes generating (604) a document including a list of search results responsive to the search request. For example, referring to FIG. 1B, the information provider 112 can generate a search results document of content that is accessible from devices connected to the network 104 and that relates to the "Hawaii vacations" query. The search results document can include links to the various content. For example, the search results document can include a link to a document 128 that is stored on the server 106 and associated with the web domain www.hawaii.com; the search results document can include other links to similar documents 134 and 140. In addition, the list of search results can include links to content in web notebooks, such as the web notebooks 146 and 148. The search results document can be displayed in a browser window running on a client such as the browser window depicted in FIG. 2.

The method 600 includes generating (607) an icon that when invoked places content associated with a first search result in a web notebook. For example, referring to FIGS. 2 and 3, the document can be generated (604) to include a control or link, such as the "Add Note" control 302 associated with the first search result 212. In some implementations, a control or link can be provided with each individual search result, such that upon activation of the control or link, content associated with the corresponding search result can be added to a web notebook.

The method 600 includes forming (610) a correlation between a first search result in the list of search results and a web notebook associated with a user account. In some implementations, forming the correlation includes copying content associated with the search result into a web notebook. For example, referring to FIG. 3, text associated the first search result 212 can be added to the web notebook depicted by the window 304 when a user selects the control 302. In some implementations, a link corresponding to the search result can be copied to the web notebook.

The correlation can be formed manually, semi-automatically, or automatically. For example, manual correlation can be made by the system presenting a user with all open notebooks (e.g., associated with that user's user account) when a selection of a control is made, and receiving a user selection identifying the notebook to which the content should be sent. Alternatively, one notebook can be classified as a default notebook, such as the notebook shown in FIG. 3, and the search result can be clipped directly to that notebook. In an automatic correlation, the clipped content, or the web page to which the content refers, can be compared to the content of all of an individual user's notebooks and a notebook can be automatically selected based on the comparison. For example, if one notebook has a heading, title or other user annotation of "travel" or "vacation," and the search term or search result include these terms or similar terms such as "Paris vacation" or "travel to Las Vegas," the relevant notebook can be automatically identified, or can be selected as a default and presented to the user for confirmation, possibly with an option for the user to select a different notebook.

Figure 7:
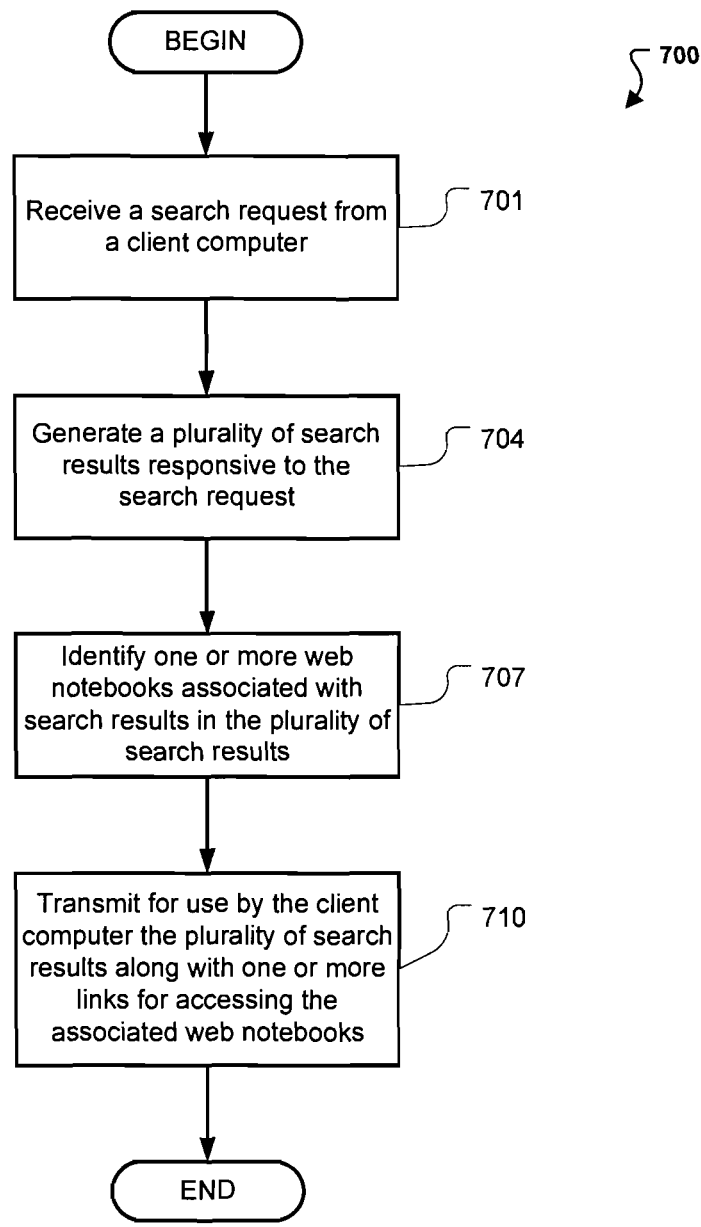
FIG. 7 is a flow diagram of an example method of presenting search results to a user for review.

FIG. 7 is a flow diagram of an example method 700 of presenting search results to web user for review. The method 700 can be implemented by an information provider (e.g., the information provider 112), in response to input received from a client device (e.g., client device 102). In operation, the method can present search results to a user of a client device and allow the user to select a specific search result to access web notebooks that are associated with the specific search result.

The method 700 includes receiving (701) a search request from a client computer. For example, the information provider 112 can receive a search request from the client device 102 for information related to "Hawaii vacations." Moreover, the search request can be associated with a specific user account (e.g., as described above, a user may have previously logged into an interface through which the search request is received by the client computer, thereby enabling the identification of a specific user account).

The method 700 includes generating (704) a plurality of search results responsive to the search request. For example, referring to FIG. 1B, the information provider 112 can generate a plurality search results related to content that is accessible from devices connected to the network 104 and that relates to the "Hawaii vacations" query. The search results can include links or icons that a user of the client device can select to access corresponding content that is responsive to the search request. For example, the search results can be presented as web results, shopping results (e.g., Froogle results), image results, video results, book results, scholarly article results, map results, or results in any other appropriate format. In particular, referring to FIG. 1B, the plurality of search results can include links to the documents 128, 134 and 140 that include portions A1, A2, B1, B3, C2 and C3—each of which may relate to "Hawaii vacations."

The method 700 includes identifying (707) one or more web notebooks associated with search results in the plurality of the search results. In some implementations, an association between a search result and a web notebook can be automatically made when the web notebook includes content that has already been clipped from the search result or from a web document that corresponds to the search result. For example, referring to FIG. 1B, the information provider 112 can identify notebooks 146 and 148 as associated with search results that identify the web documents 128, 134 and 140, since the web notebook 146 includes notes A1, B1 and C2 and C3 clipped from the web documents 128, 134 and 140; and the web notebook 148 includes notes A2 and B3 clipped from web documents 128 and 134.

The method 700 can also include transmitting (710) the plurality of search results along with the one or more links for accessing associated web notebooks. For example, the information provider 112 can transmit results to the client device 102, which, when displayed in a browser, can appear as shown in the screenshot 202. In particular, the search result 212 can be provided with a "Notebooks" link 320 that when selected, causes notebooks to be displayed that have content that has been clipped from a web document associated with the search result 212.

Figure 8:
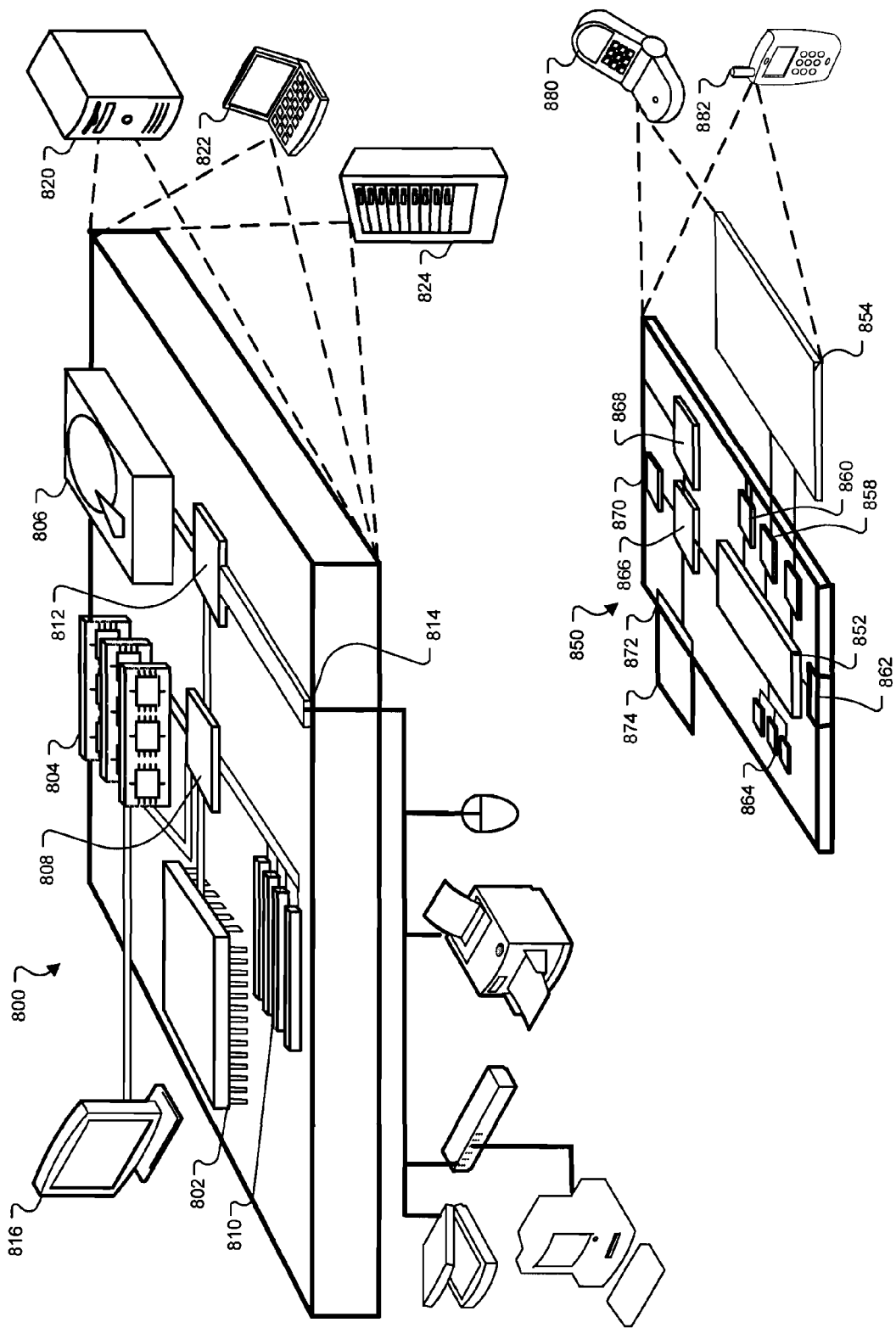
FIG. 8 is a block diagram of computing devices and that can be used to implement the systems and methods described herein.

FIG. 8 is a block diagram of computing devices 800 and 870 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 870 is intended to represent various forms of mobile devices, such as personal digital assistants, cellular telephones, smartphones, and other similar computing devices. The components shown here, their connections and relationships, and their functions, are meant to be exemplary only, and are not meant to be limiting.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In-Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874 or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications can be made without departing from the spirit and scope of the disclosed implementations. For example, various forms of the flows shown above can be used, with steps re-ordered, added, or removed. Also, although several applications of web notebooks and information providers have been described, it should be recognized that numerous other applications are contemplated. Accordingly, other implementations are within the scope of the following claims.

What is claimed is:

1. A computer-implemented method of adding web-based content to a web notebook, comprising:
    producing multiple search results responsive to a search request using a web document index;
    generating and displaying multiple controls corresponding to the multiple search results,
    wherein each of the multiple controls, when invoked, causes content from a corresponding search result in the multiple search results to be placed in a web notebook associated with a user account,
    wherein the web notebook is one of multiple existing user web notebooks stored in a distributed or centrally hosted data store and comprises a document including portions of content from various other web documents, and
    wherein the web notebook is further associated with a designation that is stored in a notebook index, the designation indicating that the web notebook is to be shared with other users;
    in response to a user invocation of a first control of the multiple controls, the first control corresponding to a first search result:
        identifying first content associated with the first search result,
        identifying the web notebook as one of the multiple existing user web notebooks stored in the distributed or centrally hosted data store, by matching content of the web notebook to a characteristic of the first search result, and by matching a heading or title of the web notebook to the search request of the first search result, and
        placing the first content in the web notebook;
    displaying the web notebook including the first content;
    in response to a user invocation of a second control of the multiple controls, the second control corresponding to a second search result:
        identifying second content associated with the second search result, and
        placing the second content in the web notebook,
    wherein a correlation is formed between the first and second search results and the web notebook; and
    displaying the second content in the web notebook.

2. The computer-implemented method of claim 1, wherein at least one of the multiple corresponding controls comprises a textual description.

3. The computer-implemented method of claim 1, wherein each of the multiple controls corresponds with exactly one search result.

4. The computer-implemented method of claim 1, wherein at least one of the multiple search results is selected from the group consisting of an image search result, a text search result, a scholarly article search result and video search result.

5. The computer-implemented method of claim 1, wherein at least one of the multiple search results is a map search result.

6. The computer-implemented method of claim 1, wherein at least one of the multiple search results is a shopping search result.

7. The computer-implemented method of claim 1, wherein at least one of the multiple search results is a book search result.

8. The computer-implemented method of claim 1, further comprising receiving input that identifies the user account.

9. The computer-implemented method of claim 1, wherein the characteristic comprises textual content of web documents associated with the first and second search results or keywords associated with a document related to the first and second search results.

10. The computer-implemented method of claim 1, wherein the content in the one of multiple existing user web notebooks comprises user-supplied titles, headings or annotations in the multiple existing user web notebooks.

11. The computer-implemented method of claim 1, wherein the web notebook comprises an identified web notebook.

12. The computer-implemented method of claim 1, wherein generating the multiple search results comprises applying the search request to the notebook index, wherein the notebook index comprises content from web notebooks.

13. The computer-implemented method of claim 1, further comprising clipping at least part of one of the multiple search results into a web notebook.

14. The computer-implemented method of claim 1, wherein the correlation is formed only after input is received from a user selecting one of the multiple controls corresponding to a search result of the multiple search results.

15. The computer-implemented method of claim 1, wherein at least one of the multiple controls is generated only after input has been received to access a document referenced by one of the multiple search results.

16. The computer-implemented method of claim 15, wherein the at least one control is generated only after the document corresponding to the one search result has been accessed for a period greater than a predetermined time period.

17. The computer-implemented method of claim 16, further comprising associating the at least one control with content that was reviewed in the document corresponding to the search result.

18. The computer-implemented method of claim 17, further comprising displaying a preview of the content associated with the at least one control and providing a user an opportunity to accept the content.

19. The computer-implemented method of claim 1, wherein the web notebook is displayed as a surfalong window.

20. The computer-implemented method of claim 19, wherein the surfalong window resides in a main content display area of a browser.

21. The computer-implemented method of claim 1, further comprising storing the web notebook in the distributed or centrally hosted data store.

22. The computer-implemented method of claim 1, wherein the web notebook comprises multi-media web content clipped from a plurality of web documents stored on one or more servers.

23. The computer-implemented method of claim 1, wherein each of the first and second content comprises at least one of a hyperlink to a web site corresponding to the respective first or second search result, a snippet from the web site, and a uniform resource locator (URL) for the web site.

24. The computer-implemented method of claim 1, further comprising:
    receiving user input; and
        generating at least one of user content, the heading, an annotation and navigation content in the web notebook based on the user input.

25. A computer program product encoded on one or more non-transitory computer-readable storage media and comprising instructions that, when executed by one or more computers, cause the one or more computers to perform operations comprising:
    producing multiple search results responsive to a search request using a web document index;
    generating and displaying multiple controls corresponding to the multiple search results,
    wherein each of the multiple controls, when invoked, causes content from a corresponding search result in the multiple search results to be placed in a web notebook associated with a user account,
    wherein the web notebook is one of multiple existing user web notebooks stored in a distributed or centrally hosted data store and comprises a document including portions of content from various other web documents, and
    wherein the web notebook is further associated with a designation that is stored in a notebook index, the designation indicating that the web notebook is to be shared with other users;
    in response to a user invocation of a first control of the multiple controls, the first control corresponding to a first search result:
        identifying first content associated with the first search result,
        identifying the web notebook as one of the multiple existing user web notebooks stored in the distributed or centrally hosted data store, by matching content of the web notebook to a characteristic of the first search result, and by matching a heading or title of the web notebook to the search request of the first search result, and
        placing the first content in the web notebook;
    displaying the web notebook including the first content;
    in response to a user invocation of a second control of the multiple controls, the second control corresponding to a second search result:
        identifying second content associated with the second search result, and
        placing the second content in the web notebook,
    wherein a correlation is formed between the first and second search results and the web notebook; and
    displaying the second content in the web notebook.

26. The computer program product of claim 25, wherein at least one of the multiple corresponding controls comprises a textual description.

27. The computer program product of claim 25, wherein each of the multiple controls corresponds with exactly one search result.

28. The computer program product of claim 25, wherein at least one of the multiple search results is selected from the group consisting of an image search result, a text search result, a scholarly article search result and video search result.

29. The computer program product of claim 25, wherein at least one of the multiple search results is a map search result.

30. The computer program product of claim 25, wherein at least one of the multiple search results is a shopping search result.

31. The computer program product of claim 25, wherein at least one of the multiple search results is a book search result.

32. The computer program product of claim 25, wherein the operations further comprise receiving input that identifies the user account.

33. The computer program product of claim 25, wherein the characteristic comprises textual content of web documents associated with the first and second search results or keywords associated with a document related to the first and second search results.

34. The computer program product of claim 25, wherein the content in the one of multiple existing web notebooks comprises user-supplied titles, headings or annotations in the multiple existing web notebooks.

35. The computer program product of claim 25, wherein the web notebook comprises an identified web notebook.

36. The computer program product of claim 25, wherein generating the multiple search results comprises applying the search request to the notebook index, wherein the notebook index comprises content from web notebooks.

37. The computer program product of claim 25, wherein the operations further comprise clipping at least part of one of the multiple search results into a web notebook.

38. The computer program product of claim 25, wherein the correlation is formed only after input is received from a user selecting one of the multiple controls corresponding to a search result of the multiple search results.

39. The computer program product of claim 25, wherein at least one of the multiple controls is generated only after input has been received to access a document referenced by one of the multiple search results.

40. The computer program product of claim 39, wherein the at least one control is generated only after the document corresponding to the one search result has been accessed for a period greater than a predetermined time period.

41. The computer program product of claim 40, wherein the operations further comprise associating the at least one control with content that was reviewed in the document corresponding to the search result.

42. The computer program product of claim 41, wherein the operations further comprise displaying a preview of the content associated with the at least one control and providing a user an opportunity to accept the content.

43. The computer program product of claim 25, wherein the web notebook is displayed as a surfalong window.

44. The computer program product of claim 43, wherein the surfalong window resides in a main content display area of a browser.

45. The computer program product of claim 25, wherein the operations further comprise storing the web notebook in the distributed or centrally hosted data store.

46. The computer program product of claim 25, wherein the web notebook comprises multi-media web content clipped from a plurality of web documents stored on one or more servers.

47. The computer program product of claim 25, wherein each of the first and second content comprises at least one of a hyperlink to a web site corresponding to the respective first or second search result, a snippet from the web site, and a uniform resource locator (URL) for the web site.

48. The computer program product of claim 25, wherein the operations further comprise:
    receiving user input; and
        generating at least one of user content, the heading, an annotation and navigation content in the web notebook based on the user input.

49. A system comprising:
    one or more computers; and one or more non-transitory storage devices storing instructions that are operable, when executed by the one or more computers, to cause the one or more computers to perform operations comprising:

producing multiple search results responsive to a search request using a web document index;

generating and displaying multiple controls corresponding to the multiple search results, wherein each of the multiple controls, when invoked, causes content from a corresponding search result in the multiple search results to be placed in a web notebook associated with a user account, wherein the web notebook is one of multiple existing user web notebooks stored in a distributed or centrally hosted data store and comprises a document including portions of content from various other web documents, and wherein the web notebook is further associated with a designation that is stored in a notebook index, the designation indicating that the web notebook is to be shared with other users;

in response to a user invocation of a first control of the multiple controls, the first control corresponding to a first search result:

identifying first content associated with the first search result, identifying the web notebook as one of the multiple existing user web notebooks stored in the distributed or centrally hosted data store, by matching content of the web notebook to a characteristic of the first search result, and by matching a heading or title of the web notebook to the search request of the first search result, and placing the first content in the web notebook;

displaying the web notebook including the first content;

in response to a user invocation of a second control of the multiple controls, the second control corresponding to a second search result:

identifying second content associated with the second search result, and placing the second content in the web notebook, wherein a correlation is formed between the first and second search results and the web notebook; and displaying the second content in the web notebook.

50. The system of claim 49, wherein at least one of the multiple corresponding controls comprises a textual description.

51. The system of claim 49, wherein each of the multiple controls corresponds with exactly one search result.

52. The system of claim 49, wherein at least one of the multiple search results is selected from the group consisting of an image search result, a text search result, a scholarly article search result and video search result.

53. The system of claim 49, wherein at least one of the multiple search results is a map search result.

54. The system of claim 49, wherein at least one of the multiple search results is a shopping search result.

55. The system of claim 49, wherein at least one of the multiple search results is a book search result.

56. The system of claim 49, wherein the operations further comprise receiving input that identifies the user account.

57. The system of claim 49, wherein the characteristic comprises textual content of web documents associated with the first and second search results or keywords associated with a document related to the first and second search results.

58. The system of claim 49, wherein the content in the one of multiple existing web notebooks comprises user-supplied titles, headings or annotations in the multiple existing web notebooks.

59. The system of claim 49, wherein the web notebook comprises an identified web notebook.

60. The system of claim 49, wherein generating the multiple search results comprises applying the search request to the notebook index, wherein the notebook index comprises content from web notebooks.

61. The system of claim 49, wherein the operations further comprise clipping at least part of one of the multiple search results into a web notebook.

62. The system of claim 49, wherein the correlation is formed only after input is received from a user selecting one of the multiple controls corresponding to a search result of the multiple search results.

63. The system of claim 49, wherein at least one of the multiple controls is generated only after input has been received to access a document referenced by one of the multiple search results.

64. The system of claim 63, wherein the at least one control is generated only after the document corresponding to the one search result has been accessed for a period greater than a predetermined time period.

65. The system of claim 64, wherein the operations further comprise associating the at least one control with content that was reviewed in the document corresponding to the search result.

66. The system of claim 65, wherein the operations further comprise displaying a preview of the content associated with the at least one control and providing a user an opportunity to accept the content.

67. The system of claim 49, wherein the web notebook is displayed as a surfalong window.

68. The system of claim 67, wherein the surfalong window resides in a main content display area of a browser.

69. The system of claim 49, wherein the operations further comprise storing the web notebook in the distributed or centrally hosted data store.

70. The system of claim 49, wherein the web notebook comprises multi-media web content clipped from a plurality of web documents stored on one or more servers.

71. The system of claim 49, wherein each of the first and second content comprises at least one of a hyperlink to a web site corresponding to the respective first or second search result, a snippet from the web site, and a uniform resource locator (URL) for the web site.

72. The system of claim 49, wherein the operations further comprise:

receiving user input; and generating at least one of user content, the heading, an annotation and navigation content in the web notebook based on the user input.

* * * * *